United States Patent [19]
Nelson

[11] Patent Number: 5,341,644
[45] Date of Patent: Aug. 30, 1994

[54] POWER PLANT FOR GENERATION OF ELECTRICAL POWER AND PNEUMATIC PRESSURE

[76] Inventor: Bill Nelson, 400 N. Frankwood St., Sanger, Calif. 93657

[21] Appl. No.: 794,578

[22] Filed: Nov. 19, 1991

Related U.S. Application Data

[63] Continuation-in-part of Ser. No. 506,169, Apr. 9, 1990, Pat. No. 5,087,824.

[51] Int. Cl.⁵ .................................. F02N 9/00
[52] U.S. Cl. .................................. 60/627; 60/626; 123/2; 290/1 A; 417/364
[58] Field of Search ............... 290/1 A, 1 R; 60/625, 60/626, 627; 123/2; 417/364

[56] References Cited

U.S. PATENT DOCUMENTS

| | | | |
|---|---|---|---|
| 2,364,013 | 11/1944 | Waseige | 290/1 A |
| 3,514,219 | 5/1970 | Mitchell et al. | 417/364 X |
| 4,173,951 | 11/1979 | Ishihara | 123/2 |

FOREIGN PATENT DOCUMENTS 2377751  8/1978  France .................. 290/1 A

*Primary Examiner*—Stephen F. Husar
*Attorney, Agent, or Firm*—Dennis B. Haase

[57] ABSTRACT

A power plant for generating electric power and pneumatic pressure includes an internal combustion engine, an electrical generator, and a compressor and pneumatic supply tanks. Both the electrical generator and the compressor are driven by the engine, however, the engine drive is so coupled and controlled that the engine drives the generator as its primary load, and the compressor as its secondary load and apportions the engine power between these units according to need. When the generator uses all the engine power, pneumatic power is supplied by the pneumatic supply tanks, permitting a smaller than normal drive engine. A quick start and quick kill mechanism is provided for the engine by using the air supply from the pneumatic supply tank and an air motor, and a time delay shut down relay when no power is being used. Also the generator can be used as an electric drive motor for the compressor in place of the internal combustion engine, where 110 volt power is available on the job site.

10 Claims, 6 Drawing Sheets

POWER PLANT FOR GENERATION OF ELECTRICAL POWER AND PNEUMATIC PRESSURE

This application is a continuation-in-part of my co-pending application Ser. No. 7/506,169, filed Apr. 9, 1990, now U.S. Pat. No. 5,087,824.

DESCRIPTION OF THE INVENTION

This invention relates generally to power plants, and, more particularly, power plants for simultaneously providing electrical power and pneumatic pressure.

Such power plants are frequently portable units, since the need for both electrical and pneumatic power is common where power driven hand tools are used, as in building construction, and electricity is not available at the site. Craftsmen on such projects frequently carry a power plant in a pickup truck or van to supply these power sources and size and weight are, therefore, quite important.

The prior art known to me is represented by the following U.S. Patents:

| PATENTEE | U.S. Pat. No. | ISSUE DATE |
| --- | --- | --- |
| Ishihara | 4,173,951 | Nov. 13, 1979 |
| Waseige | 2,364,013 | Jul. 14, 1942 |

Each of these references discloses the improvement of a single internal combustion engine which drives both a generator and a compressor, thus eliminating the need for a separate engine for each power source unit. The Waseige patent discloses a high speed engine geared down for coupling the power units in an effort to make the combined apparatus sufficiently light weight for use on aircraft. However, both of these patents disclose driving the power producing units simultaneously, thereby requiring a drive engine of sufficient output to handle the double load.

A need exists for a power plant of the type described, in which an internal combustion engine can be reduced in size with its output apportioned between the power sources to provide the simultaneous availability of electric and pneumatic power. Such a power plant would be smaller, lighter in weight, and more economical to operate. Also a quick start and quick kill mechanism is needed for the internal combustion engine to save fuel and reduce air pollution and noise when the engine is not in use.

It is a major object of my invention to provide a power plant which fulfills this need.

It is also an important object of my invention to provide a power plant of the type described, in which pneumatic reserve tanks are provided to supply pneumatic power when the total drive capacity of the engine is devoted to driving the generator.

It is another object of my invention to provide a control system which directs the engine to drive the compressor when the electrical power required is not sufficient to utilize the entire output of the drive engine, and to use the excess drive power to provide an increase in the pneumatic pressure reserve tanks to supply compressed air tools.

It is a further object of my invention to control my power plant so that the pneumatic pressure reserve tank provides a reserve of sufficient capacity to supply most periods of prolonged simultaneous use of both electric and pneumatic power and thereby permit replenishment of the pneumatic reserve tanks only when the electrical power is not using the total available driving power of the engine.

It is yet another object of my invention to provide a power plant of the type described, which automatically starts the drive engine if the air pressure in the reserve tanks falls below 100 pounds per square inch.

It is also a further object of my invention to provide a quick start up and quick kill system for my power plant engine by using the reserve of pneumatic pressure in the pneumatic tank to drive a pneumatic motor to start up the drive engine, and a time delay engine shut down relay when neither electric nor pneumatic power is needed.

It is also an object of my invention to provide a power plant of the type described in which the generator can be converted to use as an electric motor to replace the usual drive engine and drive the compressor alone, when 110 volt AC electric power is available at the job site.

It is yet a further object of my invention to reduce the size and weight of a power plant of the type described and, thus, enhance its portability.

It is yet a further object of my invention to provide a power plant of the type described, which is restricted in cost due to the reduced capacity required for the driving engine.

These and other objects and advantages of my invention will be more readily understood from the following detailed description of a preferred embodiment, when read together with the accompanying drawings in which.

DETAILED DESCRIPTION OF A PREFERRED EMBODIMENT

Figure 1:
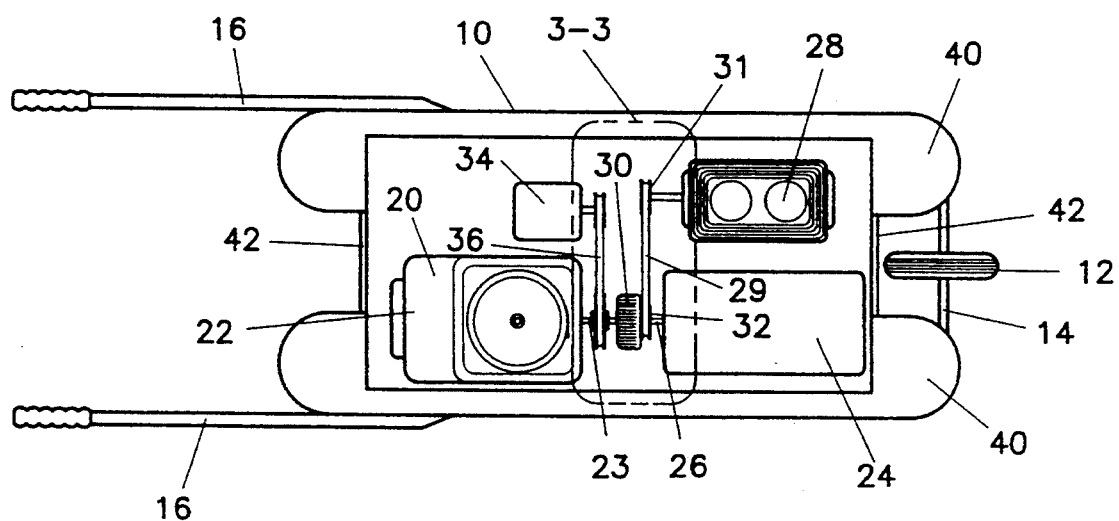
FIG. 1 is a plan view of a preferred embodiment of my invention.
Figure 2:
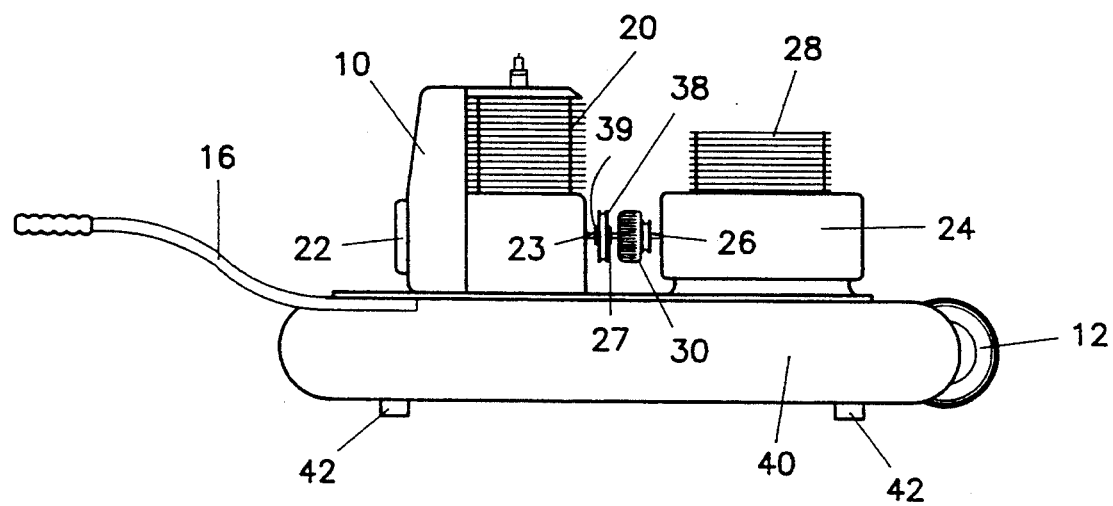
FIG. 2 is a side elevational view of the preferred embodiment of my invention as shown in FIG. 1.

Referring now to these drawings, the numeral 10 designates, generally, a preferred embodiment of my invention in a form adapted for use by workmen in the building construction industry. The power plant 10 is small enough in size and weight to be easily carried in the bed of a pick-up truck and has a front wheel 12 carried on a front axle 14, and a pair of handles 16 to enhance its portability.

The power plant 10 has a gasoline internal combustion engine 20, with a pull start mechanism 22, which rotates the crankshaft, resulting in ignition. The engine 20 is coupled through its drive shaft 23 with one or more power supplies, having as their purpose, the supplying of power to a load such as a work tool.

Accordingly, there is provided an electric power generator 24, to supply electric power to loads, or tools, requiring such power. The generator has a drive shaft 26 aligned with, and connected to, drive shaft 23 of the drive engine 20 by a centrifugal clutch 30, with the rotor connected to the drive shaft 23 and the drum connected to generator shaft 26.

Since many loads, or tools, on a job site require pneumatic power, the invention contemplates the provision of an air compressor 28, which, in the configuration shown, is mounted adjacent the electric power generator 24 and driven from the generator drive shaft 26 and the engine drive shaft 23 through the centrifugal clutch 30. The air compressor 28 is connected to the generator shaft 26 by means of a V-belt 29, the centrifugal clutch 30 and belt pulleys 31 and 32. The V-belt pulley 31 is mounted on the drive shaft of compressor 28 and is larger than the V-belt pulley 32, which attaches to the generator shaft 26 by means of the clutch 30. The larger diameter pulley 31 on the compressor shaft compared to the smaller diameter pulley 32 on the generator, accommodates the speed versus power ratios of the connected units, since the compressor requires a greater drive torque at a slower speed than the generator.

Figure 3:
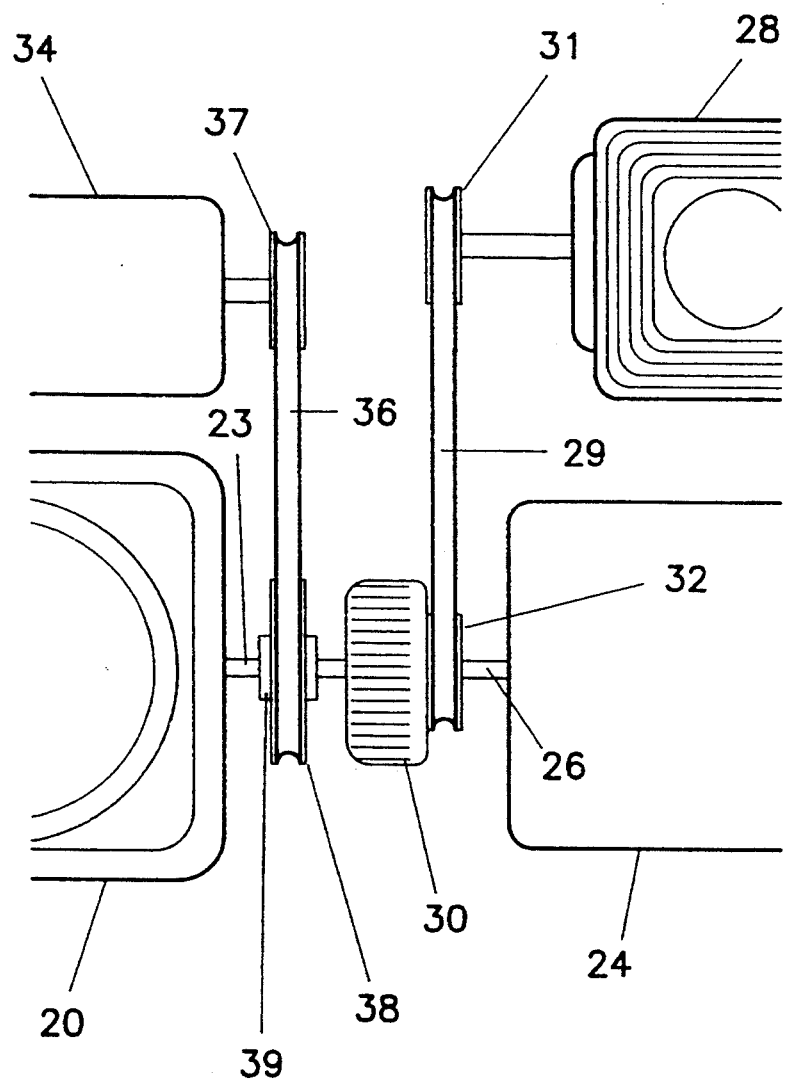
FIG. 3 is a partial, enlarged plan view taken at line 3—3 in FIG. 1 showing the drive couplings and clutch on the motor shaft.

In FIG. 3, the interconnection of the drive engine 20 with the generator 24 and the air compressor 28 through the centrifugal clutch 30 is shown in enlarged detail. In furtherance of another objective of the invention, engine start up is provided to rotate the crankshaft of the engine to cause ignition. This figure also shows one such engine start up in the form of an air driven start motor 34, connected to the engine shaft 23. As will be detailed hereinafter, the start up motor serves as an alternative to the pull starter 22, thereby providing the novel power plant of the invention with an automation capability heretofore unheard of.

The air driven start motor 34 is connected to the engine shaft 23 by a drive belt 36 through V-belt pulley 37 connected to the start motor 34 and V-belt pulley 38. The V-belt pulley 38 is attached to the engine shaft 23 by a one way coupling 39 so that the air motor is not driven after the drive engine 20 is started up.

The centrifugal clutch 30 is attached to the engine shaft 23 on one side, and to the shaft 26 of generator 24 on the other side. When the clutch is rotated at a predetermined speed by the engine, it engages, in a manner well-known in the art, and transmits driving power from the engine to the generator. The engine 20 is, therefore, not driven when the generator serves as the drive engine for the power plant.

The drive engine 20, generator 24, compressor 28, and air start motor 34, are all mounted on a pair of large elongated pneumatic pressure reserve tanks 40 which are held together by a frame 42 that serves as the base for the entire power plant 10.

Figure 4:
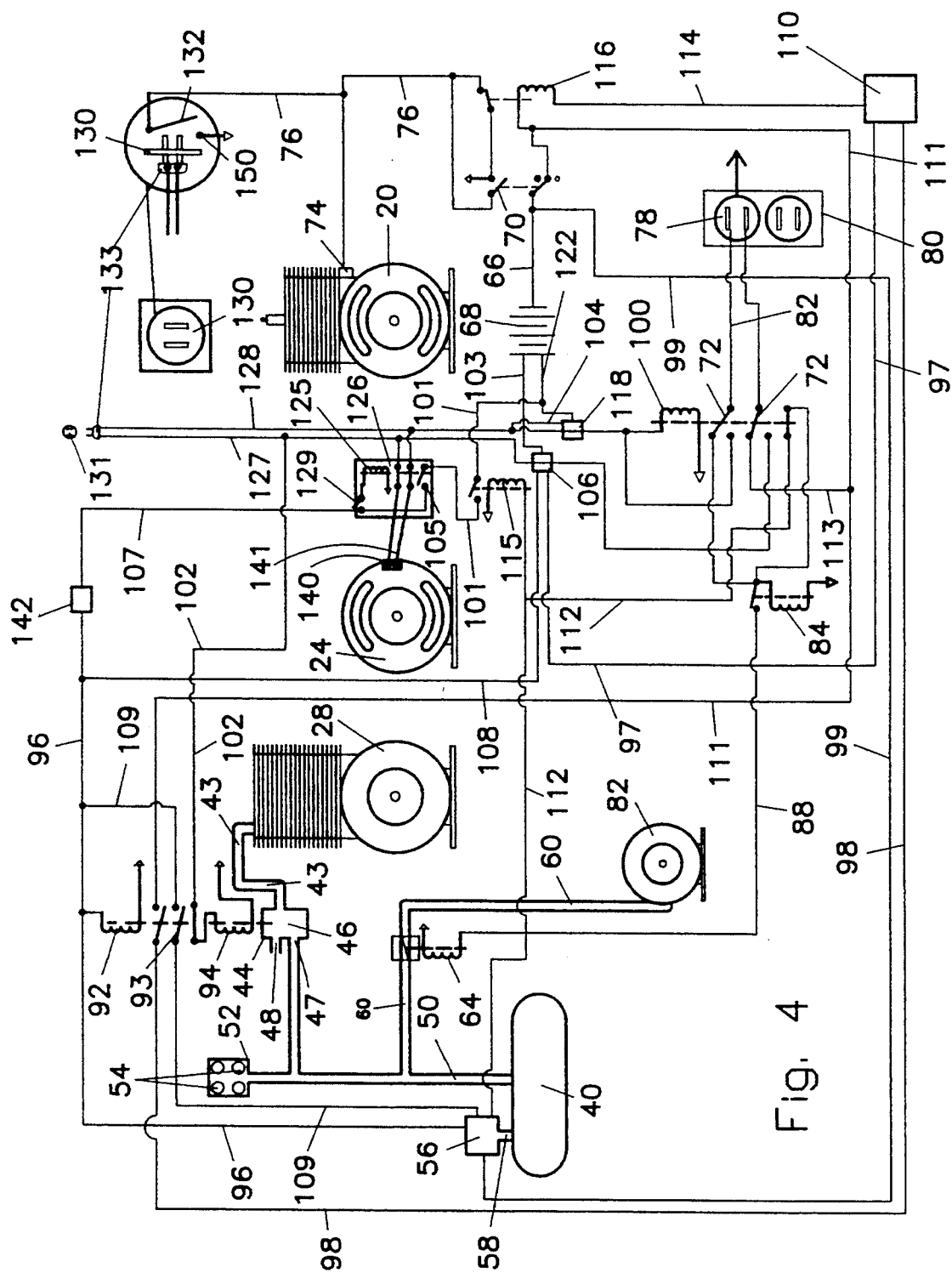
FIG. 4 is a schematic view showing the electrical and pneumatic interconnection between the principal elements of my preferred embodiment.

As best show in FIG. 4, the pneumatic pressure reserve tanks 40 are connected to the compressor 28 by an output conduit 43 through a control mechanism 44.

The control mechanism 44 includes a solenoid activated compressor load valve 46 connected to the compressor supply conduit 43. The solenoid valve 46 has an air exhaust port 48 and a tank supply port 47, which opens into a conduit 50, and is operable to divert air in the air compressor supply conduit 43 to either the air exhaust port 48 or the air tank supply conduit 50. The air tank supply conduit 50 is connected to the air tanks 40 and has an air output conduit 52 which, at its end, carries a group of air jacks 54 suitable to connect air hoses from one or more pneumatic tools (not shown) to the pneumatic pressure reserve tanks 40.

An air pressure sensor 56 is connected to the pneumatic pressure reserve tanks 40 by a pressure sensor conduit 58 positioned on one of the air tanks.

A start motor conduit 60 connects the air tank supply conduit 50 to the pneumatic start motor 82 which is drivingly connected to the internal combustion engine 20, as previously explained. A start motor solenoid valve 64 is mounted in the start motor conduit 60 and controls the supply of air from the air tanks 40 to the start motor.

The following description of the various systems' configurations will assist in clarifying the various novel features of the invention.

System Start-Up

When the start motor 82 begins turning over drive engine 20, there is no load on the drive engine because the compressor supply conduit 43 is directed to the exhaust port 48 by the control mechanism 44. Also, the generator 24 is not yet coupled to the drive engine 20 because the engine is not yet turning at a sufficient RPM to engage the centrifugal clutch 30.

The compressor load valve 46 is directed to the exhaust port 48 because there is, as yet, no generator output, and, thus, the 100 volts AC required, in the preferred embodiment, to activate the solenoid 94, is not present.

The compressor load valve 46 is effected by both a 12 volt DC solenoid 92, and a 110 volt AC solenoid 94. As soon as the engine 20 gains a predetermined speed, the centrifugal clutch 30 will engage, and rotate the generator 24 which, in turn, puts high voltage AC into the system. At first, this voltage is below its rated line voltage of 110 volts AC, because of the reduced start up speed of the generator, although rated voltage is quickly achieved.

The electrical output from the generator 24 passes to the electrical output board 80 through generator output lines 140 and 141 and via relay 126, to lines 127 and 128. This activates a 110 volt solenoid coil 100 of the isolating switch 72 and immediately changes the contact points in the switch to isolate the 12 volt power. The isolating switch 72 drops the 12 volt DC power circuit 66 from the plugs 78 on the electrical output board 80 and deactivates the solenoid of the start circuit switch 84. When the start circuit switch 84 opens, it deactivates the solenoid of the start motor valve 64 and shuts down the delivery of compressed air from conduit 60 to the start motor 34.

The system is now being driven by the drive engine 20 and the generator 24 is producing 110 volt AC electrical power to the electrical power output board 80. At the same time, the compressor 28 is being driven by the drive engine 20 through the generator drive shaft 26, although it requires very little of the engine output power, so long as the compressor load valve 46 directs the compressor output in conduit 43 to the exhaust port 48.

When the generator reaches capacity, approximately 100 volts AC, load valve solenoid 94 is excited by means of line 102. At the same time, DC solenoid 92 is deactivated, resulting in load valve 46 being moved to cut off the exhaust port 48. Accordingly, air from the compressor 28 is directed to the reserve tanks 40 through conduit 50.

Top-Off Condition

To keep as many as two air tanks near their optimum pressure during normal operation, the control mechanism 44 and compressor load valve 46 provide a "Top-Off" condition. When the tank pressure reaches 130 psi, for example, the pressure sensor 56 sends a high pressure electrical signal to the low voltage solenoid 92 via circuit line 96. This signal simultaneously activates solenoid 92 and deactivates the 110 volt AC solenoid 94 of the compressor load valve 46. This moves the load valve to open the exhaust port 48 and close the port to the tank supply conduit 50.

When solenoid 92 is activated, in addition to deactivating the 110 volts AC to solenoid 94, it closes a circuit which sends an electrical signal to a delay timer 110 via circuit line 98 which notifies the delay timer that the air tanks are full. The delay timer may provide any appropriate interval, such as 10 seconds.

Further, activation of solenoid 92 also closes a switch which initiates a "Top-Off" condition. Prior to the high pressure signal, i.e. 130 psi, which is sent to solenoid 92 by sensor 56, a "Top-Off" signal, which originates from sensor 56 whenever the tank pressure is 125 psi or greater, is sent to the relay contact 93 via circuit line 109. This "Top-Off" signal stays at relay contact 93 until solenoid 92 activates, connecting the signal, via circuit lines 109 and 96, through the solenoid 92 to ground. At this time solenoid 92 will stay activated even though the 130 psi signal on line 96 terminates because tank pressure has fallen to 129 or below. This occurs because the pressure sensor 56 is sending the 125 psi electrical signal (the "Top-Off" signal), through line 109. When the tank pressure falls below 125 psi the solenoid 92 will return to its normal deactivated position connecting 110 volts to coil 94 via circuit line 102.

In other words, the reserve pressure tanks 40 have, in the described embodiment, a high pressure point of 130 psi. Also, the "Top-Off" condition keeps the pressure tanks 40 filled to near capacity while gas engine 20 is running, by utilizing any excess engine capacity available.

If pressure sensor 56 delivers a signal to the 12 volt AC solenoid 92 of compressor load valve 46 via circuit line 109 because the tank pressure falls below 125 psi, this signal will connect the solenoid 94 of the compressor load valve 46 to the 110 volt AC line 102 and direct the compressor output to the reserve tanks 40.

This condition will continue during normal operations and this "Top Off" condition will keep the compressor load switch 46 from a fluttering response to minimal variations of tank pressure.

When pneumatic tools, such as, for example a nailer, are connected to one of the air jacks 54, and activated, the tank pressure will, of course, be lowered, and the compressor will be restarted at 125 psi in an attempt to bring the pressure back to 130 psi. If the pneumatic tool use is minimal, the compressor will periodically reestablish the tank pressure at 130 psi and its load on the drive engine 20 occurs as available.

If the pneumatic use is moderate, the compressor may continue as a load on the drive engine 20 until the use is again reduced. If the pneumatic use is substantial, however, the tank pressure may be drawn down faster than it can be replaced and may fall considerably below 125 psi. If a substantial pneumatic load is maintained for a considerable period, the tank pressure may fall to 100 psi or less. In this circumstance the compressor will tend to replace the generator as the major, up to the entire load on the engine 20.

Under start up and normal use conditions, the power plant is operated with both the compressor and generator driven by the internal combustion engine 20, with the load on the engine apportioned between the electrical load and the pneumatic load according to their momentary demands. My system consistently treats the electrical load as the primary load, since the pneumatic load has the reserve air tanks on which to fall back, and the compressor is permitted to build pressure when the drive engine has more capacity than is needed to generate the required electrical load. If the electrical load is the principal load during a particular period, but the combined loads do not exceed the drive engine 20 output, the pneumatic output of the air compressor will be delivered to replenish the tanks. If the tank pressure is at 130 psi, the compressor will be unloaded by exhausting its output into the air through the exhaust port 48.

Over Loaded Condition

If the combined loads of the generator and the compressor exceed the drive engine's capacity, a "lug-down" condition is created which slows engine speed. When that occurs, the rotational speed, and thus the line voltage from the generator, will fall below its normal of 110 volts AC. Further reduction of the engine speed could drop line voltage to the predetermined trigger voltage of 100 volts AC. A voltage sensor 106, sensitive to the trigger voltage, is mounted in the generator output circuit and when lug-down occurs it sends a signal in response to this condition. The overload signal is directed to the control mechanism 44 via circuit line 108 and then to line 96 and to the low voltage control solenoid 92 of control mechanism 44. This signal simultaneously activates the solenoid 92 and deactivates the solenoid 94 which moves the compressor load valve 46, to it's exhaust position, thereby removing the overload on the engine. It will be apparent that the unloading of the compressor is normally sufficient to permit the drive engine 20 to bring the generator back to speed. When the generator output reaches 110 volts AC or above, the overload signal delivered to the control mechanism 44 is cancelled, and normal operation is restored.

Shut Down

If the generator 24 is not subjected to any electrical load, and the tanks 40 are at 130 psi, there will be no load on the power plant drive engine 20. These conditions will result in pressure sensor 56 sending a shut down signal to the delay timer 110 via circuit line 98, as it does when the tanks are at optimum pressure. While this signal will be overridden, or cancelled, by a signal from the voltage sensor 106 if the generator is thereafter subjected to load, if no such override occurs within 10 seconds, or whatever interval the delay timer 110 is preset for, the delay timer 110 will activate a shut down solenoid 116 in the operator's control switch 70. When this occurs, the system will shut down and remain inactive until a new demand for electric or pneumatic power is made. Upon deactivation of the shut down solenoid 116, the operator's control switch will return to its "automatic" position, and the system is again ready to start up again upon demand.

Specifically, if during the 10 second dwell period provided by the delay timer 110, the electrical load is experienced, the voltage sensor 106 will signal this condition to the delay timer via circuit line 97 and cancel the shut down signal. Likewise, if the tank pressure falls below 125 psi the shut off signal from the air pressure sensor 56 to the delay timer 110 will be cancelled, since operation of the compressor is needed.

Automatic Engine Start/Kill

It is yet another novel feature of this invention that, with the engine in the off, or shut down mode, the operator of the particular electrical tool, having particular load requirements, and being powered by one of the power supplies integral to the system at the time, may automatically restart the engine as long as the operator's control switch 70 (in the case of the FIG. 4 embodiment) is in the "automatic" position, by merely connecting the load, or power tool, to the requisite power supply.

As previously alluded to, in order to start or restart the engine, as the case may be, the operator need only press the trigger of a tool connected to, in the FIG. 4 embodiment, a plug 78. In so doing, it will be seen that the closing of a switching circuit will activate the engine start up device, in this instance, in the form of air motor 34 through the low voltage circuit 66 and start circuit switch 84, and will restart the power plant.

More specifically, the start motor solenoid valve 64 is activated by a low voltage DC power circuit 66 powered by a 12 volt battery 68 (see FIG. 4). The DC power circuit 66 has an operator control switch 70, and a circuit isolating switch 72. The operator control switch 70 has an "off" position, an "on" position, and an "automatic" position. The operator control switch 70 is connected to the ignition 74 of the drive engine by an electrical circuit line 76, which is open and ungrounded when the control switch is in its "on" or its "automatic" position. When the control switch 70 is in its "off" position engine ignition 74 is grounded through line 76, to deactivate the drive engine.

When the operator control switch is in its "automatic" position, the DC power circuit 66 also connects low voltage DC power to each of several electrical outlet sockets 78 on an electrical power output board 80. This is achieved through the isolating switch 72 by electrical circuit lines 111 and 113.

In operation, the user merely plugs his electrically operated power tool, for example, an electric saw, into one of the sockets 78, and closes the circuit by pulling a trigger, or flipping a switch, or otherwise turning on the tool, which creates a load demand, and a low voltage solenoid 84, which serves as a start circuit switch, is activated.

More specifically, turning on the tool closes a circuit which connects the DC power circuit 66 to a solenoid portion of the start circuit switch 84, and this circuit activates a start motor solenoid valve 64 through circuit line 88. Since the start motor solenoid valve 64 controls the delivery of air from the reserve tanks 40 to the start motor 34 via the conduit 60, the opening of that valve causes air under pressure to be introduced into the start motor 34, to begin rotation, and as a result the internal combustion engine 20, which is connected to the start motor by belt 36, is rotated. The ignition lead, which had been grounded, is disconnected from ground, and the engine, which is turning at sufficient speed to support ignition, starts.

The invention further contemplates the use of the same control system to auto start the system under conditions where the pressure in the reserve tanks drops below a preset minimum.

For example, if the tank pressure drops below 100 psi, while the power plant is shut down, the air pressure sensor 56 will cause the system to be restarted through the circuit isolating switch 72 by means of circuit line 112.

This low pressure start up signal from the air pressure sensor 56 is generated by DC voltage power delivered directly from the DC battery 68 via circuit line 99. The low pressure start up signal is transmitted to one contact point of the isolating switch 72 and on to the solenoid of the start circuit switch 84. It is also transmitted to the solenoid of switch 115 which delivers DC volts from the DC power circuit 66 to the motor/generator conversion switch 126, explained later.

Figure 7:
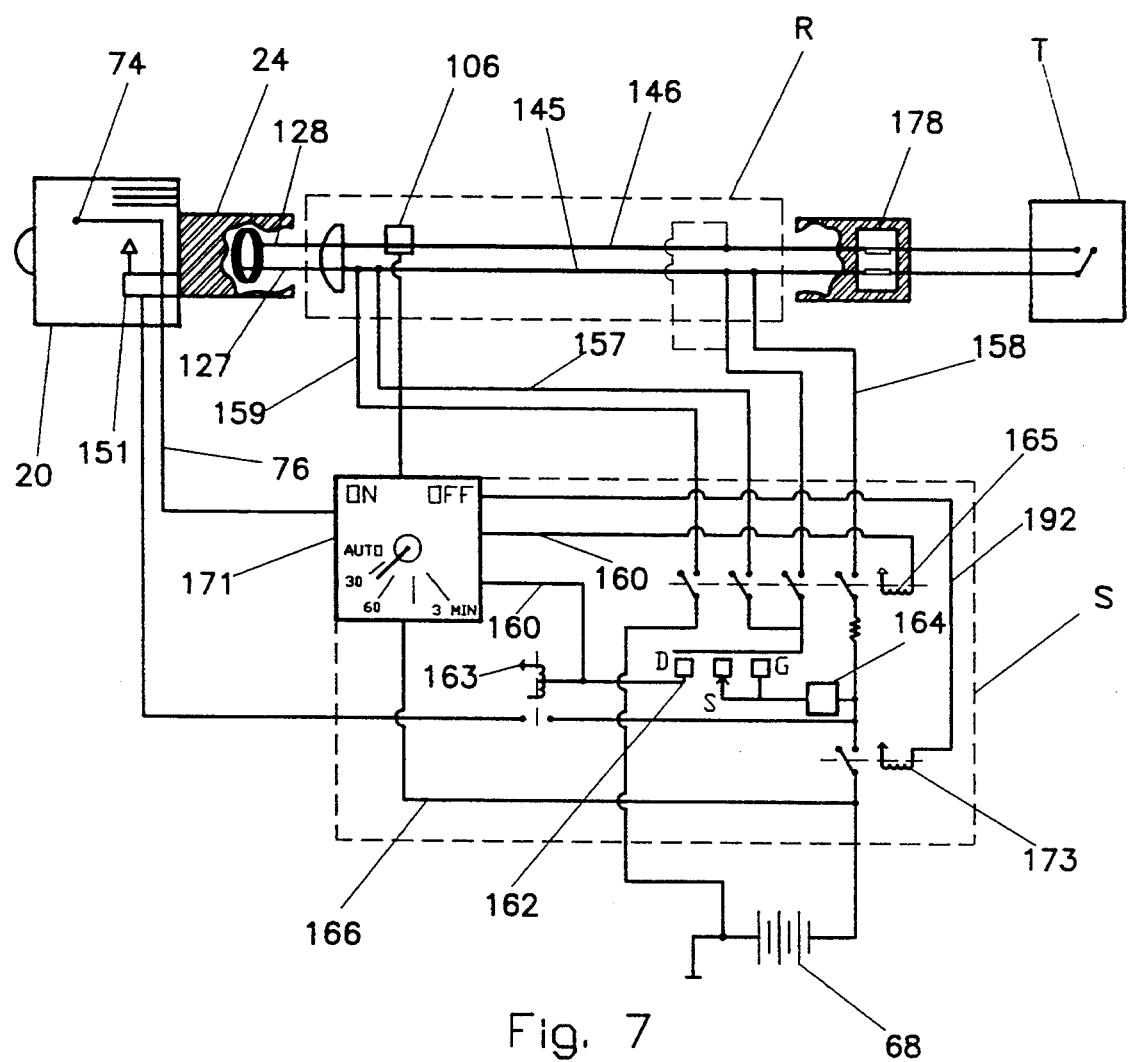
FIG. 7 is a schematic diagram of an alternative embodiment of the present invention employing an electric starter.
Figure 8:
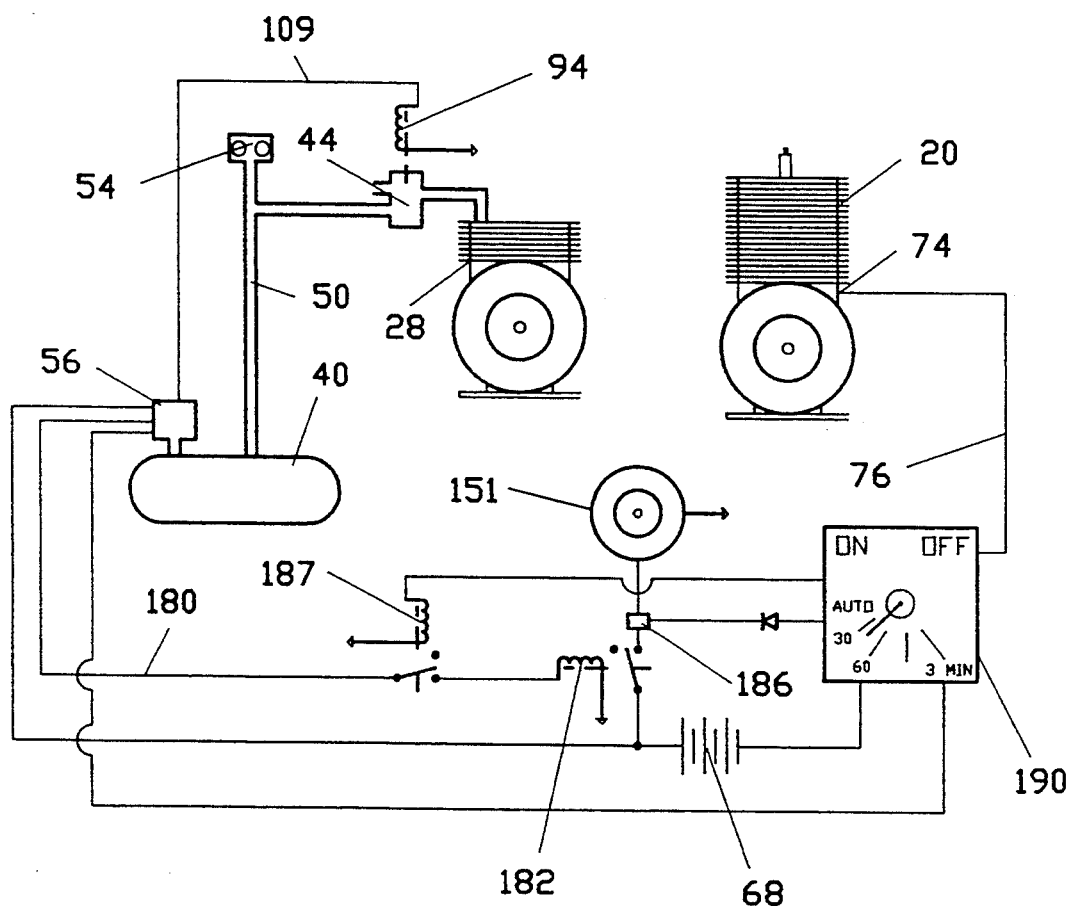
FIG. 8 is a diagram of an alternative embodiment in which an electric starter is used with a pneumatic system.

With reference now to FIGS. 7 and 8, an alternative embodiment of this automatic start/kill aspect of the invention is illustrated. This alternative, which permits the elimination of the somewhat cumbersome air start up motor, 28, and the need for the large isolation switch 72, in accomplishing engine start up. Thus, a simplified, yet equally effective, means is provided for placing the capacity to start and/or stop the motor generator unit, in the hands of the tool operator, who is typically in a location which is remote from the power unit.

As will be described in greater detail hereinafter, this desirable feature is accomplished by the novel employment of a switching circuit S responsive to a resistance imbalance to open and/or close actuating circuits. By establishing a predetermined load or resistance in the circuit, changes in the resistance on the reference side acts as a trigger to actuate the switch to connect a starter at the motor 20, to the battery 68, as well as performing other functions to be described.

In a power unit for which this alternative start/kill system has particular, although obviously not exclusive, utility, a 12 volt DC starter 150, of known construction, is provided at the engine 20. The battery, 68 is connected to the starter, through the switching system S.

A key to facilitating this alternative, is the switching system S, which includes means for electronically reducing the output from the battery 68 from 12 V DC to a few millivolts, and passing the reduced voltage through a reference circuit R, which circuit includes a work tool.

Thus in the FIG. 7 embodiment, the switching circuit taps into a reference resistance circuit R, which plugs into the generator output at outlet 78 (FIG. 4). Reference circuit R which may be packaged as a unit in order to make it usable on several different power, includes fixed or reference resistance elements 145 and 146. Tap leads 158 and 159 are connected into the element 145, and a voltage is placed across that element by means of these leads in that they connect to the battery through a fixed resistance which reduces the voltage to a more useable level, such as 5 millivolts.

The switching takes advantage of the known characteristics of a FET (Field Effect Transistor) 162 as an electronic gate having the capability to open and close circuits on command. Each FET has a built in field resistance which serves as a standard against which the reference circuit is initially balanced. In order to read the reference circuit, lead 157 connects the FET to resistance element 145. The reference circuit terminates in a socket or outlet 178, in to which work tool T is plugged.

Start up may be accomplished, in the first instance, when the worker using the tool T closes the power circuit to the tool, such as, by pulling or depressing a trigger, or start switch, with a dwell timer 171 in the "automatic" position. When that occurs, the resistance in the reference circuit increases by the resistance in the tool, creating an imbalance at the switching system. As a result, the FET senses the imbalance through lead 157, and it is wired to the starter solenoid 163 so as to cause it to close, thereby connecting the starter 150 to the battery 68. The starting motor 151 reacts, causing the motor to begin to rotate, and when ignition is experienced, to start. Coincidentally, relays 165 are opened, having been previously closed when the timer is set to the automatic position, to disconnect the reference circuit R. It will be appreciated that the closing of these relays results in the reference voltage being placed across the reference circuit.

Once the engine experiences ignition, the generator begins to turn, and a small, but measurable, voltage is experienced in element 146, which is read by sensor 106. Sensor 106 causes relay 173, normally closed, to open, thereby disconnecting the starter 151 from the battery 68, to prevent damage to the starter.

It has been determined that the switching mechanism S can be particularly effective by employing the features of the Field Effect Transistor (FET), 162 as an electronic gate for controlling the start up function of this alternative embodiment. It will be appreciated that a silicone controlled rectifier (SCR), which is another recognized form of electronic gate, may also be employed with simple modification of the wiring scheme, without departure from the invention.

A further attribute of the present invention is the kill provision of timer 171, which includes, in addition to the on, off, and automatic positions, found in switch 70 (FIG. 4), a dwell timer which, as will be seen, is capable of allowing engine operation for a predetermined time without load on the power tool circuit.

As illustrated, and by way of example, once the motor/generator is activated, if the sensor does not detect, and transmit to the timer, that the power tool circuit is under load, the timer will automatically shut down after a preset amount of time, such as, for example, 1, 2, or 3 or however many minutes may be appropriate to a given task. This is accomplished by grounding of the ignition through ground wire 76. Incorporation of this feature avoids the incessant stopping and starting of the motor which would otherwise be experienced, and permits the operator to stop what he is doing for a short, preselected, period without interruption of power, or excessive wear on the start motor and engine components. If the tool remains unused beyond the preselected time period, the system automatically shuts down. Having now explored alternatives involving air start systems, and electrical start systems, the same operative theories employed in such systems may be easily applied to a system which does not include the generator as a power supply option to provide engine start capability in response to low pressure in a reservoir tank.

With reference to FIG. 7, there is a pneumatic power supply illustrated as the sole supply of the system. Thus, in this embodiment, the air compressor 28 is engine 20 driven and the generator 24, as a power supply, is eliminated. As described with respect to the FIG. 4 embodiment, the air tank 40 is filled through conduit 50, and governed by control mechanism 44.

As in the FIG. 7 embodiment, the engine is started by an electrical starter 151, controlled by a switching circuit S, which responds to a signal from the pressure sensor 56 to auto start the system when a preset minimum pressure is sensed in the reservoir, 40.

Accordingly, when sensor 56 detects a low pressure condition, current in line 180 closes starter solenoid 182, connecting the starter to the battery 68. The motor is rotated, ignition is experienced, and the motor 20 drives compressor 28. At the same time, the bendix, which is an integral part of the starter 151, begins to spin freely, and the amperage draw at the starter drops dramatically. In this embodiment, the sensor 186 detects the current drop and opens relay 187 through lead 188. Relay 182 is opened, and the engine ignition is grounded. to kill the engine.

It is a feature of the FIG. 8 embodiment that an engine cut off is also provided when a preset maximum pressure is experienced in the tank 40. Thus, sensor 56 will send a signal to the delay timer 190, which is similar in construction to the timer mechanism of the FIG. 7 embodiment. The signal from the sensor 56 triggers a count down of predetermined length, at the end of which the engine ignition is grounded, stopping the engine. Coincidentally, solenoid 94 of the control mechanism is excited, causing air to be vented to atmosphere, thereby maintaining pressure in the reservoir 40 at a not to exceed value while the shutdown procedure is completed.

If during the shutdown procedure, there is a dramatic drop in tank pressure, the kill signal from sensor 56 is interrupted, and the engine will continue to drive the compressor until a kill signal is received for the requisite period of time as determined by the setting on the dwell timer.

Battery Recharge

To recharge the DC 12 volt battery 68 of the low voltage power circuit 66, a transformer 118 is provided which receives 110 volts AC from the generator 24 via circuit line 128 and reduces and rectifies it to a 12 volt DC trickle charge which connects to the battery via circuit line 122.

Motor/Generator

To utilize an alternate source of electricity when it is available on the job site, I have also provided a system which allows the generator 24 to be converted into an electric motor which will then become an electric drive motor for the compressor. To utilize the available electricity, the operator's control switch 70 is placed in its "off" position, and the electric cord 133 is removed from outlet socket 130. When this is done, connector 132 will ground out the ignition 74 of the drive engine 20 means by ground 150 through electric circuit line 76. Plug 133 in electric cord is inserted in an incoming 110 volt AC electric socket 131. At this time, there will be 110 volts AC electricity on lines 127 and 128. Line 128 will activate transformer 118 by circuit line 104. In turn, the transformer 118 will charge the 12 volt DC battery 68 following rectification. Also, line 128 will then activate coil 100 causing the circuit isolating switch 72 to change to its 110 volt AC (high voltage) position. This will place 110 volt AC on outlet plug 78. Conversion switch 126, which is attached to generator 74, will now cause the generator to act as an electric drive motor. At the top of conversion switch 126 is a manually operable switch lever 129. The switch lever 129 has two positions, one marked "generator" for the generation of electricity, the other marked "electric motor" to receive electricity. When the switch lever 129 is in the "electric motor" position, lines 127 and 128 are transferring electricity to electric motor through lines 140 and 141 via the conversion switch 126. When power is so applied, the electric motor starts turning the air compressor 28 which pumps air into tanks 40 by methods already described. The air pressure sensor 56 is receiving 12 volts DC from the battery 68 through line 99. When pressure in the tanks 40 reaches 130 psi the air pressure sensor 56 sends a signal through the circuit line 96, which is received by solenoid 92, and opens the exhaust port 48 to the atmosphere, as previously described. The circuit line 96 also continues this signal to second delay timer 142 which will delay the signal for two seconds. Then the signal is sent on through the second delay timer 142 to the switch lever 129 by line 107. The switch lever 129 is in its "electric motor" position, which allows the DC current from the air pressure sensor 56 to activate a solenoid 125 that drives the conversion switch 126 downward. Breaking the electrical current to the drive motor/generator 24. When conversion switch 126 moves downward, a contact point 105 will carry low voltage to solenoid 125. This will keep the conversion switch 126 activated until air pressure in air tanks 40 drops below 100 psi. At that point, electric motor/generator 24 is shut down and air compressor 28 stops turning. As air is used from the tank, and the pressure falls below 100 psi, air pressure sensor 56 will send a low pressure signal through line 112 which activates solenoid 115 opening the switch and terminating the 12 volt DC flow of electricity to solenoid 125. When this happens, conversion switch 126 delivers 110 volts DC to lines 140 and 141 restarting electric motor/generator 24.

Another important feature and function of the electric motor/generator circuitry is as follows: If the electrical power from outlet plug 131 falls below 100 volts AC because of other electrical tools being used through electrical output board 80, the voltage sensor 106 will signal this voltage drop through circuit line 108 and circuit line 96 on to the low voltage solenoid 92. Activating solenoid 92, deactivates solenoid 94 and opens the air exhaust port 48. When the air exhaust port 48 opens, it takes the load off of air compressor 28. This in turn will cause electric motor/generator 24 to "free wheel", that is, operate without a load. When the motor/generator is "free wheeling" it will draw less current, thereby allowing more electrical current to pass through outlet plug 78 and into power tools. In this condition, the voltage sensor 106 will send a DC signal to the second delay timer 142. If the voltage on the circuit line 127 does not increase up to 110 volts within two seconds after the second delay timer 142 receives its signal, the signal will pass on to and activate the solenoid 125, removing the power to the electric motor/generator. This condition will exist until the line voltage returns to 110 volts AC or more.

Alternate Reed Head Compressor Regulator Valve

Figure 5:
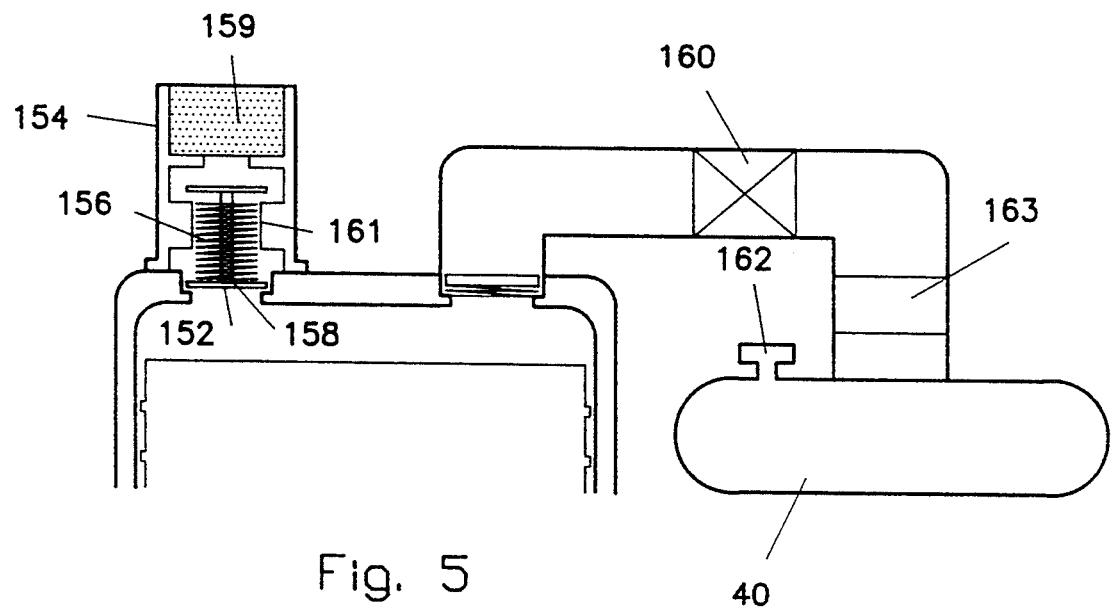
FIG. 5 is a side elevational view of an alternative means of by-passing the compressor output to the atmosphere.

In reed head compressors, an exposed intake valve is mounted in the compressor head. As best shown in FIG. 5, I provide an alternative compressor by-pass and relief valve mechanism 152, which is considerably simpler than the combined electrical control circuit and solenoid valve, just described.

My alternate valve mechanism 152 has a housing 154 which attaches to the compressor head on top of the exposed intake valve. A solenoid 156 is mounted in the housing 154 and has a plunger 158 disposed above but aligned with the intake valve. An air filter 159 is provided above the plunger 158. When a substantial electrical load is placed on the generator, the solenoid 156 is activated and drives the plunger downward onto the valve mechanism 152 to hold the valve open. This opens the compressor head and unloads the compressor. To prevent the leakage back of air from the reserve air tanks 40 through the compressor head and out through to open intake valve, I provide a standard one-way check valve 160, well-known in the industry. I also provide a standard type mechanical pressure relief valve 162 to relieve any excessive pressure in the pneumatic system. In addition, I provide a second coil 161 about the solenoid 156 which activates the solenoid when the tank pressure reaches its upper capacity, to vent the compressor head pressure. The second coil 161 is activated by a pressure sensitive relay 163 through electrical circuit lines, (not shown).

Supercharger

In small gasoline engines of the type normally used to drive my pneumatic-electric power plant, a speed governor can be used to adjust the engine throttle to the power load. When the load is minimal, the throttle is closed down to near idle and as the load increases the throttle is opened to increase the engine speed and power output. If the load on the drive engine 20 reaches an amount which exceeds the engine capacity, which in my power plant only occurs when the combination of the electrical and pneumatic loads becomes excessive, the engine will lug-down and the fuel mixture will become overly rich causing black smoke to be emitted from the exhaust and the engine to finally stall. This "lug down" and stall condition can be relieved by a supercharger mechanism which increases the air supply to the engine to correct the overly rich mixture. Typical superchargers are turbo type air pumps driven by the engine to supply air at greater than atmospheric pressure. By using the pneumatic pressure in the reserve tanks, I have devised a more effective and economical supercharger mechanism for my power plant.

Figure 6:
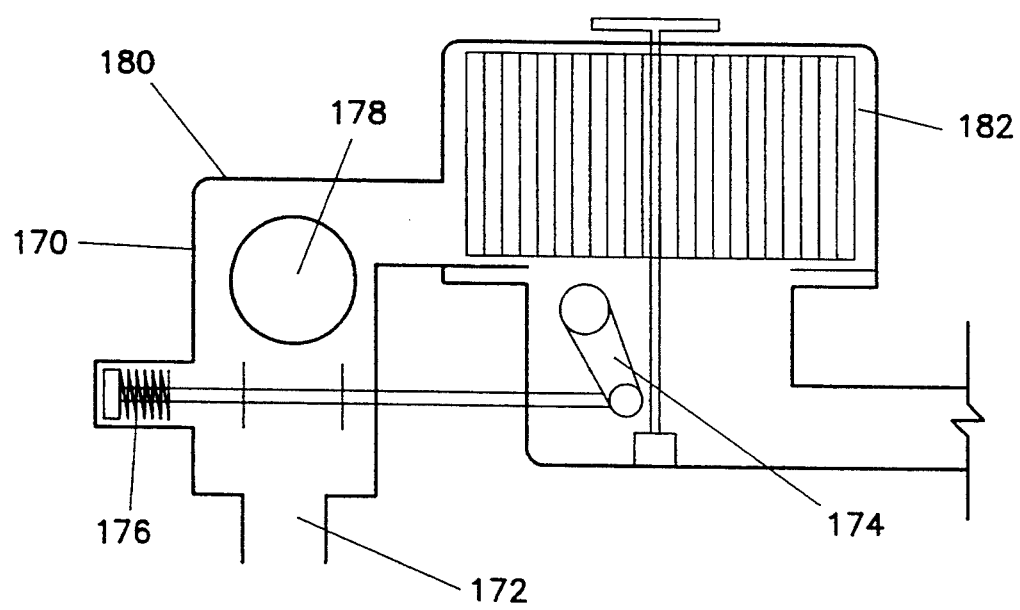
FIG. 6 is an alternative mechanism for supercharging the power plant drive engine by using the pneumatic reserve.

As best seen in FIG. 6, I provide a supercharger mechanism 170 which is activated by an overload on the drive engine output, to bleed pressurized air from the pneumatic pressure reserve tanks 40 into the engine air intake 172. My supercharger mechanism 170 is mounted on the carburetor air intake and attached to an adjustable fuel mixture jet 174. It is controlled by an electrically actuated solenoid 176 which, when activated, switches the engine air intake from an atmospheric air intake port 178 to a pressurized air intake port 180.

The pressurized air intake port 180 is connected to the pneumatic pressure reserve tanks 40, via an air regulator 182 which reduces air pressure to about two pounds per square inch over atmospheric pressure. The control solenoid 176 is energized by an electrical power relay 186 when the electrical power circuit shows a lug-down condition in the drive engine.

When excessive drive engine load is sensed by the electrical power relay 186, the supercharger solenoid 176 is energized, switching the engine intake air form the atmospheric air intake port 178 to the pressurized air intake port 180, and the adjustable fuel mixture jet 174 is enriched beyond the normal setting. The pressurized air and additional fuel from the increased enrichment jet result in a supercharged fuel mixture which increases the engine horsepower to accommodate the excess drive engine load. Since such excessive electrical loads are frequently caused by the simultaneous starting of several electrical tools at once, it normally only occurs at random and for short periods. By utilizing the available supply of pressurized air from the storage tank, I am able to supercharge the engine to overcome engine shutdown during such events and provide a versatile power system with a minimized drive capacity.

Pneumatic power is drawn from the pneumatic pressure reserve tanks 40 by pneumatic power lines 52 which are connected to pneumatically driven hand tools. Electrical power is connected to electrically driven hand tools through an electrical output power board 80, which includes overload relays.

From this detailed description of preferred embodiments of my invention it should be understood that it is a very versatile, economical apparatus for providing both electrical and pneumatic power and is fully capable of achieving the objects and providing the advantage heretofore attributed to it.

What is claimed is:

1. In a power plant for driving at least one power supply for the provision of electrical or pneumatic power to an operator controlled power tool, by selectively driving one or both of an electric generator or pneumatic compressor, each of which being selectively connected to the tool, and a drive engine for providing motive power to the power supplies, the improvement comprising:
    engine start up means for starting said drive engine in response to a demand for power from said tool; said engine start up means including switching means connectable to said tool, and operable upon demand for power from said tool, to cause drive engine start up.

2. The apparatus as set forth in claim 1, wherein, said drive engine start up means includes a pneumatic start up motor; a reservoir of compressed air connectable with said pneumatic start up motor; and said switching means being electrically driven, and including a valve between said reservoir and said pneumatic start up motor, said switching means adapted to open said valve in response to a demand for power from said tool, to thereby operate said pneumatic start up motor, to thereby start said drive engine.

3. The apparatus as set forth in claim 1 wherein, said drive engine start up means includes an electric start up motor connected to said drive engine; said switching means including electronic switching responsive to a demand for power from said tool, to interconnect said electric start motor and a static source of electrical power to thereby energize said electric start motor to start said drive engine.

4. The apparatus as set forth in claim 3, wherein a static source of electric power is provided, said control means being connected to said static source,
    said control means including an electrical circuit of balanced resistance, and being responsive to a change in resistance resulting from the actuation of said tool to connect said static source of electrical power to said drive engine start up means to thereby start said engine; and
    said control means further including means defining a cut off circuit to disconnect said drive engine start up means from said static source when said engine is started.

5. The apparatus as set forth in claim 1, wherein, said switching means includes a dwell time, said timer being adapted to kill said drive engine after a predetermined period of time of no load demand from said power tool.

6. The apparatus as set forth in claim 5, wherein, said drive engine start up means includes a pneumatic start up motor; a reservoir of compressed air connectable with said pneumatic start up motor; and said switching means being electrically driven, and including a valve between said reservoir and said pneumatic start up motor, said switching means adapted to open said valve in response to a demand for power from said tool, to thereby operate said pneumatic start up motor, to thereby start said drive engine.

7. The apparatus as set forth in claim 5, wherein, said drive engine start up means includes an electric start up motor connected to said drive engine;
    said switching means including electronic switching responsive to a demand for power from said tool, to interconnect said electric start motor and a static source of electrical power to thereby energize said electric start motor to start said drive engine.

8. In a power plant for generating electric power and pneumatic power by selectively driving one or both of an electrical power generator unit and a pneumatic power compressor with an air storage tank unit, and having a single drive engine, control means for starting up and shutting down said power plant comprising:
    a pneumatic start motor interconnected with said drive engine, said start motor having a pneumatic conduit interconnected with said air-storage tank and disposed to deliver pneumatic pressure to said start motor;
    an electrically actuatable start up valve disposed in said pneumatic conduit, to open and close said conduit and thereby control the delivery of pneumatic pressure to said start motor;
    a low voltage DC electric power supply interconnected with said start-up valve including a operator control switch interconnecting said DC power supply and said start-up valve, and disposed to actuate said start-up valve with said DC power supply upon closing of said operator control switch.

9. In a power plant of the type described in claim 8 which also includes:
    an electrical charging circuit interconnected between said electric power generator unit and said DC voltage power supply, said charging circuit having a transformer which converts AC power from said electrical power generator unit to low voltage DC power.

10. A power plant as described in claim 8 which also includes:
    a pneumatic start motor releasably interconnected with said drive engine, said start motor having a pneumatic conduit interconnected with said air-storage tank unit and disposed to deliver pneumatic pressure thereto;

an electrically actuatable start-up valve disposed in said pneumatic conduit and actuatable by low voltage DC electrical power to open and close said conduit and thereby control the delivery of pneumatic pressure to said start motor;

a DC low voltage electrical circuit including an operator control switch interconnecting said DC power supply and said control valve, and disposed to actuate said start-up valve with said DC power supply upon closing of said control switch.

said electrical circuit means further includes an electrical shut-down circuit disposed, upon actuation, to connect the ignition of said drive motor to ground;

said electrical circuit means further includes a connecting circuit whereby said first signal from said power output sensor is transmitted to said valve means to direct pressurized air from said compressor to the atmosphere, and said second signal from said power output sensor is transmitted to said electrical shut-down circuit to actuate said circuit and ground the ignition of said drive motor; and a delay timer interconnected with said electrical shut down circuit and said electrical circuit means, said delay timer being activated by the simultaneous occurrence of no electrical load and maximum pneumatic pressure for a short period and then disposed to ground the ignition of said drive engine and shut down said power plant.

* * * * *